United States Patent
McDonald

(10) Patent No.: US 11,134,821 B2
(45) Date of Patent: Oct. 5, 2021

(54) WASHING BUCKET FOR HOUSEHOLD, COMMERCIAL AND INDUSTRIAL USE FOR CLEANING MOPS

(71) Applicant: Tim McDonald, Missouri City, TX (US)

(72) Inventor: Tim McDonald, Missouri City, TX (US)

(*) Notice: Subject to any disclaimer, the term of this patent is extended or adjusted under 35 U.S.C. 154(b) by 490 days.

(21) Appl. No.: 16/039,948

(22) Filed: Jul. 19, 2018

(65) Prior Publication Data

US 2018/0360291 A1 Dec. 20, 2018

Related U.S. Application Data

(63) Continuation-in-part of application No. 15/993,913, filed on May 31, 2018, now Pat. No. 11,064,842, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(Continued)

(51) Int. Cl.
*A47L 13/00* (2006.01)
*A47L 13/58* (2006.01)
*A47J 47/18* (2006.01)
*A22C 17/08* (2006.01)
*A47L 13/59* (2006.01)

(Continued)

(52) U.S. Cl.
CPC .............. *A47L 13/58* (2013.01); *A22C 17/08* (2013.01); *A22C 21/0061* (2013.01); *A22C 25/02* (2013.01); *A47J 47/18* (2013.01); *A47L 13/59* (2013.01); *B08B 3/102* (2013.01)

(58) Field of Classification Search
CPC ..... A22C 17/08; A22C 21/0061; A22C 25/02; A47L 13/00; A47L 13/08
USPC ....... 452/106, 119, 123, 200, 209, 211, 215, 452/217, 224, 232, 245, 249, 252–254, 452/264, 269
See application file for complete search history.

(56) References Cited

U.S. PATENT DOCUMENTS 2,920,606 A * 1/1960 Anderson .............. A01K 61/59
                                                    119/206
4,815,160 A     3/1989 Smith
(Continued)

FOREIGN PATENT DOCUMENTS

| CN | 107684406 A | 2/2018 |
| TW | 201117762 A | 6/2011 |
| WO | 2017/143135 A1 | 8/2017 |

OTHER PUBLICATIONS

International Search Report and Written Opinion of the ISA for corresponding PCT/US2018/052645.

*Primary Examiner* — Richard T Price, Jr.
(74) *Attorney, Agent, or Firm* — Egbert, McDaniel & Swartz, PLLC

(57) ABSTRACT

A washing bucket has a container with an interior defined by wall and a bottom, a fluid inlet affixed to the wall of the container and communicating with the interior of the container, and a fluid outlet opening to the wall of the container and positioned at a level higher than a level of the fluid inlet. The fluid inlet is positioned adjacent to the bottom of the container. The fluid inlet has a connector positioned exterior of the wall of the container and adapted to connect to a water hose. The fluid outlet has a diameter greater than a diameter of the fluid inlet. The fluid outlet has a pipe affixed to the wall of the container.

12 Claims, 5 Drawing Sheets

Related U.S. Application Data

(60) Provisional application No. 62/640,261, filed on Mar. 8, 2018.

(51) Int. Cl.
  *A22C 25/02* (2006.01)
  *B08B 3/10* (2006.01)
  *A22C 21/00* (2006.01)

(56) References Cited

U.S. PATENT DOCUMENTS

| | | | |
|---|---|---|---|
| 5,288,022 A | 2/1994 | Sesser | |
| 5,368,235 A | 11/1994 | Drozdoff et al. | |
| 6,374,867 B1 * | 4/2002 | Maiuro | A47J 47/18 141/115 |
| 6,976,286 B1 * | 12/2005 | Sanabria | A47J 47/18 134/186 |
| 10,773,279 B2 * | 9/2020 | McDonald | A46B 17/06 |
| 2004/0019998 A1 | 2/2004 | Sander | |
| 2005/0076465 A1 | 4/2005 | Rousey | |
| 2009/0265871 A1 * | 10/2009 | Wooten | A47L 13/20 15/119.1 |
| 2013/0047332 A1 * | 2/2013 | Mirabito | E03C 1/055 4/650 |
| 2013/0180461 A1 * | 7/2013 | Fujiyoshi | A01K 61/54 119/234 |
| 2014/0263105 A1 | 9/2014 | Kontorovich et al. | |
| 2018/0146689 A1 | 5/2018 | McDonald | |

* cited by examiner

WASHING BUCKET FOR HOUSEHOLD, COMMERCIAL AND INDUSTRIAL USE FOR CLEANING MOPS

CROSS-REFERENCE TO RELATED APPLICATIONS

The present application is a continuation-in-part of U.S. patent application Ser. No. 15/993,913, filed on May 31, 2018 and entitled "Washing Bucket for Household, Commercial and Industrial Use for Cleaning Mops and for Chemical Cleaning". U.S. application Ser. No. 15/993,913 is a continuation-in-part of U.S. application Ser. No. 14/877,519, filed on Oct. 7, 2015, and entitled "Apparatus and Method for Washing Meat and/or Produce". U.S. patent application Ser. No. 14/877,519 is a continuation-in-part of U.S. patent application Ser. No. 14/812,545, filed on Jul. 29, 2015, and entitled "Apparatus and Method for Cleaning Produce". U.S. patent application Ser. No. 14/812,545 issued as U.S. Pat. No. 9,408,412 on Aug. 9, 2016. U.S. patent application Ser. No. 14/812,545 is a continuation-in-part of U.S. patent application Ser. No. 14/550,159, filed on Nov. 21, 2014. U.S. patent application Ser. No. 14/550,195 issued as U.S. Pat. No. 9,321,286 on Apr. 26, 2016 and is entitled "Apparatus and Method for Cleaning Game". The present application also claims priority from U.S. Provisional Patent Application Ser. No. 62/640,261, filed on Mar. 8, 2018 and entitled "Washing Bucket for Household, Commercial and Industrial Use for Cleaning Mops and for Chemical Cleaning".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to washing buckets. More particularly, the present invention relates to mop buckets. Additionally, the present invention relates to mop buckets in which a continuous supply of fresh water is provided during the washing and rinsing of the mop. The present invention also relates to chemical cleaning operations in commercial and industrial settings.

2. Description of Related Art Including Information Disclosed Under 37 CFR 1.97 and 37 CFR 1.98

A mop bucket is used in conjunction with a mop for cleaning floors and the like. At the start of the cleaning process, fluid used for mopping is held within the bucket and is generally clean. However, as the floor is mopped, and the mop is repeatedly dipped into the bucket, the fluid therein becomes less and less clean as dirt and other matter is transferred from the floor to the wet mop and then to the fluid in the bucket. Occasionally, a user may place the mop into a wringer located above the bucket in order to remove fluid from the mop, but again, this merely transfers dirty fluid to the fluid within the bucket.

The problem often encountered with the use of cleaning buckets is that the dirt deposited on the mop bucket liquid collects at the bottom of the container and that turbulence of the liquid, as when rinsing out a mop, washes the dirty water back into the main body of liquid where it may again be absorbed into the mop. The mop then spread the dirt back out on the floor, leaving unsightly streaks and leading to incomplete cleaning. In an attempt to alleviate this problem, the mop bucket has to be repeatedly emptied and cleaned out.

The problem is twofold. First, the there is the difficulty of separating the heavy components, such as dirt or grease attached to the dirt, from cleaner water in the mop bucket. The second difficulty is turbulence within the water caused by the swishing of the mop within the bucket or residual sloshing movement of water after the bucket has been moved. The turbulence tends to disturb soil, sludge and other heavy components of dirty water and evenly distribute them within the body of water to be picked up again when the mop is rinsed in the bucket, even if care is taken up to push the mophead all the way down to the bottom of the bucket.

Another problem with existing mop buckets is that it is extremely difficult to maintain a supply of hot water within the bucket. Hot water is important for removing grease and other contaminants from the string of a mop. Cold water is generally less effective at removing such contaminants. With existing mop buckets, even if a supply of hot water is initially introduced into the mop bucket, the instant the strings of a mop are placed within the hot water, the temperature of the water greatly diminishes. Over time, the heat exchange between the relatively cold strings of the mop and the water within the container will reduce the temperature of the water to the ambient temperature. As such, a need has developed so at as to continuously supply hot water to a mop bucket throughout the cleaning process.

There is a great need for a mop bucket that provides relatively clean fluid for mopping throughout the cleaning process. Many different types of filtering systems have been employed to recycle fluid in mop buckets. For example, U.S. Pat. No. 3,630,369 teaches a mop cleaning device wherein a supply of cleaning fluid is circulated through a container. However, relatively heavy particles are separated from the fluid by what appears to be a gravity trap while leaving smaller particles still suspended within the fluid. In another example, U.S. Pat. No. 4,161,799 discloses a mop bucket that treats dirty fluid. However the system leaves undesirable matter within the bucket itself.

In the past, various patents have issued relating to mop buckets and cleaning systems for mop buckets. For example, U.S. Pat. No. 5,333,353, issued on Aug. 2, 1994 to M. Taylor, teaches a mop wringer that has a long operating handle and mounts on the rear wall of the bucket. When so mounted, the wringer is supported on the sidewalls of the bucket at or toward the front of the wringer by support ledges integrally molded into the sidewalls of the bucket below the lower rim thereof. The ringer engages the bucket in the manner which opposes the tendency for the back of the wringer to lift off of the bucket when operating force is applied to the wringer handle.

U.S. Patent Application Publication No. 2005/0076465, published on Apr. 14, 2005 to B. Rousey, describes a mop bucket filtering system. This mop bucket filtering system includes a mop bucket defining a cleaning solution basin. A pump is externally mounted on the bucket and is in fluid communication with the cleaning solution basin. A filter system is exteriorly mounted on the bucket in fluid communication with the cleaning solution basin and is operationally connected to the pump. The pump draws fluid from the cleaning solution basin through the filter system for return to the basin after the cleaning solution has been filtered.

U.S. Pat. No. 6,000,094, issued on Dec. 14, 1999 to R. S. Young, teaches a removal and replaceable filter and filter holder for a mop cleaning bucket. This filter receives dirt settling under gravity from the contained liquid so that the dirt collects in and passes through the filter so as to be trapped therebelow. The holder is a rigid or substantially rigid perforated support structure spaced above and below the dirt-receiving filter. The holder is supported in the bucket in spaced relation to the bottom of the bucket and protects the filter. The filter is a thin, sturdy, semi-rigid and floatable member with many holes so that soiled water passes through and collects in the bottom of the bucket.

U.S. Pat. No. 5,976,266, issued on Nov. 2, 1999 to Anderson et al., provides a method for cleaning and wringing a mop. The mop is provided with a handle, mop strings and a plunger. The plunger is located between the handle and the mop strings. A sleeve having a top and an open bottom end is provided with the sleeve being perforated near the bottom end. The sleeve is tapered so that the bottom end is larger than the top end. The plunger and the mop strings are located inside the sleeve with the plunger positioned near the top end of the sleeve and the mop strings depending from the plunger. The bottom end of the sleeve is located in a liquid so that the liquid enters a bottom portion of the sleeve through the perforations. The handle is moved down so as to compress the mop strings with the plunger, with the mop strings being immersed in the liquid, so as to force dirt from the mop strings out of the sleeve perforations. The handle is moved up so as to raise the plunger inside the sleeve and decompress the mop strings so as to allow the mop strings to absorb liquid from outside the sleeve to the perforations.

FIG. 1 is an illustration of a prior art mop bucket 1. This prior art mop bucket 1 can have a wide variety of configurations. Broadly stated, the mop bucket 1 includes a container having a wall extending therearound so as to define an interior volume for receiving a mop therein. In FIG. 1, the mop bucket 1 has interior volume 2 and wall 3. A wringer 4 is supported on the wall 3 so as to be positioned above the interior volume 2. A handle 5 is cooperative with the wringer 4. In normal use, the mop strings of the mop can be placed into the interior 6 of the wringer 4. The handle 5 is then rotated so as to squeeze the mop strings within the interior of the wringer 4. Water from the mop strings can then be discharged through the apertures 7 formed on the wringer and into the mop bucket 1. Wheels 8 are placed at the bottom 9 of the container 3 so as to allow the container 3 to move along an underlying surface.

One of the problems with the mop bucket 1, as shown in FIG. 1, is that when the wringer 4 squeezes the mop strings so as to discharge the dirty water from the mop strings, the dirty water will then enter the interior volume 2 and accumulate therein. A mop is then inserted into the interior volume 2 so as to get more water for mopping purposes. The water that is received by the mop strings when they enter the interior volume 2 of the container 3 will be dirty. This results in the mopping of a floor surface with dirty water, thereby leaving streaks and contamination on the floor. A need has developed so that the interior 2 of the container 3 will have a continuous supply of clean water therein and in which the dirty water caused by the wringing of the mop is discharged from the container 3.

As can be seen from the mop bucket one of FIG. 1, the mop bucket will be filled with an initial supply of hot water. Once the strings of the mop are introduced into the interior volume 2 so as to obtain more water for mopping purposes, the temperature of the water reduces because of heat exchange. After the dirty mop is reintroduced into the water in the interior volume 2 of the container 3, this will further reduce the temperature of the water within the mop bucket. As was stated herein previously, hot water is much more effective at removing contaminants and grease from the strings of a mop. Once the water becomes cold, then the mop bucket becomes much less efficient at removing contaminants from the strings of the mop. Once again, this will cause a dirty mop to continue to be used during the cleaning of a floor.

It is an object of the present invention to provide a washing bucket that effectively cleans the mop strings of a mop.

It is another object of the present invention provide a washing bucket that allows a continuous supply of clean water to be delivered to the mop when the mop strings are positioned within the bucket.

It is another object of the present invention to provide a washing bucket whereby a continuous supply of clean hot water is maintained within the interior of the washing bucket.

It is still another object of the present invention to provide a washing bucket that effectively discharges debris from the interior of the bucket.

It is a further object of the present invention to provide a washing bucket that can be adapted for domestic, commercial and industrial uses.

It is still another object of the present invention to provide a washing bucket that enhances the ability to effectively mop a floor.

It is still a further object of the present invention to provide a washing bucket which conserves water.

It is another object of the present invention to provide a washing bucket that avoids any possibility of overflowing the bucket.

It is still another object of the present invention provide a washing bucket that is easy to use, relatively inexpensive and easy to manufacture.

It is still a further object of the present invention provide a washing bucket which allows debris and dirty water to be directed to a specific location exterior of the washing bucket.

These and other objects and advantages of the present invention will become apparent from a reading of the attached specification and appended claims.

BRIEF SUMMARY OF THE INVENTION

The present invention is a washing bucket comprising a container having an interior defined by wall and a bottom, a fluid inlet affixed to the wall of the container, and a fluid outlet opening through the wall of the container. The fluid inlet communicates with the interior of the container. The fluid inlet is positioned adjacent to a bottom of the container. The fluid outlet is positioned at a level higher than a level of the fluid inlet.

The fluid inlet has a connector positioned exterior of the wall of the container. The connector is adapted to connect to a water hose. A water hose is threadedly connected to the connector of the fluid inlet. The water hose extends exteriorly of the container. The fluid inlet has a nozzle adjacent to an end thereof and located within the interior of the container. The nozzle is adapted to direct a pressurized flow of water toward an area adjacent to the bottom of the container. In the preferred embodiment of the present invention, the nozzle has the shape of a chord of a circle, a straight edge of the chord of the circle being below a curved portion of the chord of a circle. A cap can be removably affixed over the connector of the fluid inlet.

The fluid inlet has a reducer positioned in an interior thereof. The reducer is adapted to limit a rate of water flow into the interior of the container. The fluid inlet is a fitting with an interior passageway. The reducer is a disk positioned in the interior passageway. The disk has a hole formed therethrough.

In the present invention, the fluid outlet has a diameter greater than a diameter of the fluid inlet. The fluid outlet comprises a pipe affixed to the wall of the container. One end of the pipe opens to the interior of the container. An opposite end of the pipe is positioned exterior of the container. In particular, the pipe can be an elbow swivel mounted to the container so as to be movable between a first position in which the opposite end of the pipe extends upwardly and a second position in which the opposite end of the pipe extends downwardly. A conduit can be affixed to the opposite end of the pipe. The conduit extends away from the container. The conduit is removably affixed to the opposite end of the pipe. A cap can be removably affixed to the opposite end of the pipe so as to close the opposite end of the pipe. In particular, the washing bucket of the present invention can be used as a conventional bucket by placing the cap over the connector and by placing the another cap over the opposite end of the pipe.

A wringer is affixed to an upper edge of the container. The wringer is positioned above a bottom of the container. The wringer is adapted to remove water and debris from the strings of the mop.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 2:
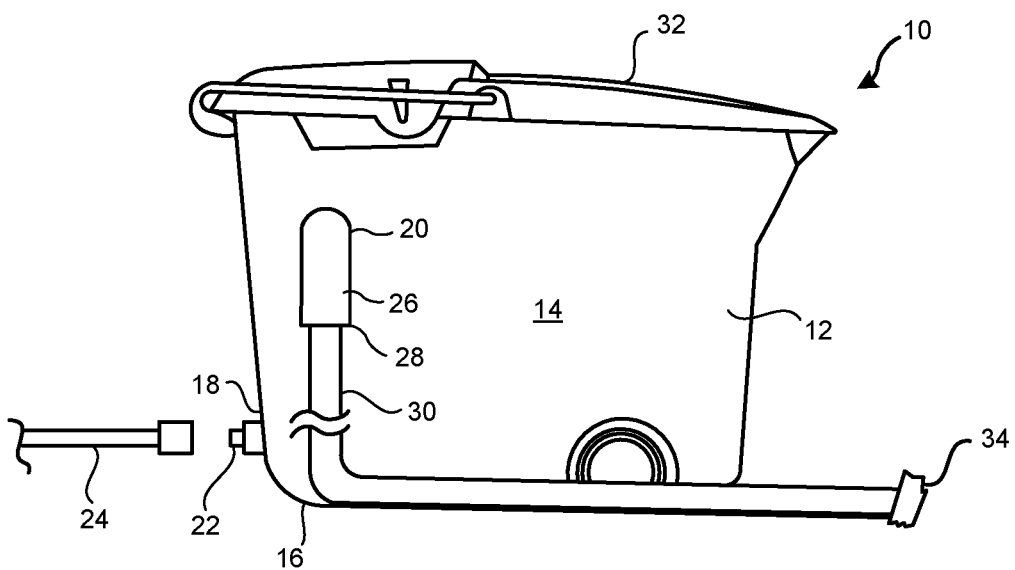
FIG. 2 is a side elevational view showing the locket a washing bucket in accordance with the teachings of the present invention.

Referring to FIG. 2, there shown the washing bucket 10 in accordance with the teachings of the present invention. The washing bucket 10 includes a container 12 having an interior defined by a wall 14 and a bottom 16. A fluid inlet 18 is affixed to the wall 14 of the container 12. The fluid inlet 18 communicates with the interior of the container 12. As can be seen, the fluid inlet 18 is positioned adjacent to the bottom 16 of the container. A fluid outlet 20 opens through the wall 14 of the container 12. The fluid outlet 20 is located at a level higher than a level of the fluid inlet 18.

The fluid inlet 18 has a connector 22 positioned exterior of the wall 14 of the container 12. This connector 22 is adapted to be connected to a water hose 24. The water hose 24 can be threadedly connected to the connector 22 of the fluid inlet 18. The water hose 24 extends exteriorly of the container 12. The water hose 24 can be connected to any supply of water, such as a water faucet.

In FIG. 2, it can be seen that the fluid inlet 22 has a diameter less than the diameter of the fluid outlet 20. The fluid outlet 20 comprises a pipe 26 that is affixed to the wall 14 of the container 12. One end of the pipe 26 opens to the interior of the container 12. The opposite end 28 of the pipe 26 is positioned exterior of the container 12.

In FIG. 2, the pipe 26 is an elbow swivel mounted to the exterior of the container 12 so as to be movable between a first position (not shown) in which the opposite end 28 of the pipe 26 extends upwardly and a second position (shown in FIG. 2) in which the opposite end 28 of the pipe 26 extends downwardly. A conduit 30 is affixed to the opposite end 28 of the pipe 26. It can be seen that the conduit 30 extends away from the container 12.

With reference to FIG. 2, it is to be understood that the water hose 24 supplies pressurized water to the fluid inlet 18 and into the interior of the container 12. The top 32 of the container is open so as to allow a mop to be introduced therein. Ultimately, as the water hose 24 delivers water through the inlet 18 in a direction adjacent to the bottom 16 of the container 12, the interior volume of the container 12 will continue to fill with water. Ultimately, the level of the water will reach the level of the outlet 20. Once water reaches the level of the outlet 20, it will be discharged from the interior of the container 12 through the pipe 26 and through the conduit 30 to a remote location. In particular, the end 34 of the conduit 30 can be extended to a drain, a sink, an an exterior location, or any other place where dirty water can be discharged.

In normal use, a mop will be introduced through the opening 32 at the top of the container 12 and inserted into the water within the container 12. The strings of the mop will absorb water. Since the water hose 24 can be connected to a faucet, hot water from the faucet can be delivered through the hose 24 continuously into the interior of the container 12.

As such, the mop strings will have hot water thereon. The mop can then be used so as to mop a floor. After a certain amount of time, the mop strings will be reintroduced through the opening 32 of the container 12 and back into the water within the container. The hot water within the container 12 will serve to separate grease and other debris from the strings of the mop. Often, the mop strings are pressed against the bottom 16 of the container 12 so as to squeeze the contaminants therefrom. Since the nozzle of the fluid inlet 18 is directed generally adjacent to the bottom 16 of the container 12, this will provide a jet of water so as to further assist in removing contaminants from the mop strings.

Ultimately, the grease and debris that has been discharged from the mop into the water in the container 12 will continue to rise within the water in the container as water continues to be introduced into the container 12 from the water hose 24 through the fluid inlet 18. Ultimately, since water is continuously discharged through the fluid outlet and the pipe 26, the debris will ultimately rise with the water until the contaminants reach the fluid outlet 20. These contaminants and debris can then be discharged through the pipe 26 and outwardly through the conduit 30 into a remote drain.

Figure 1:
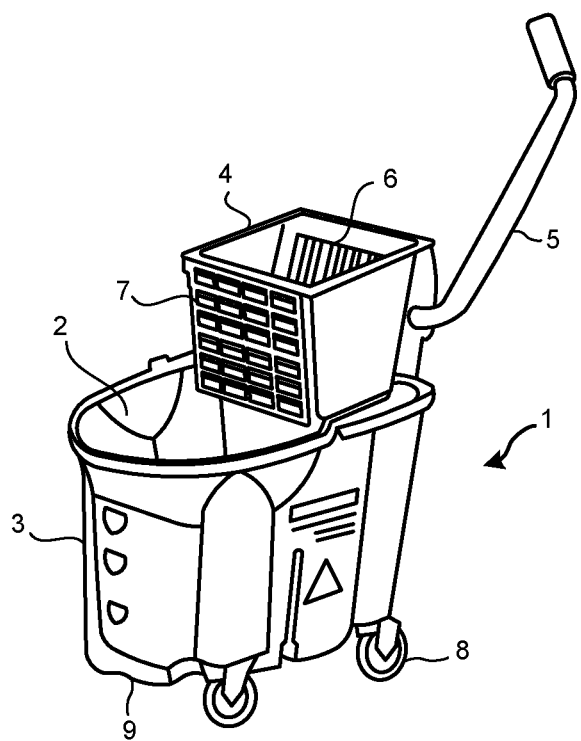
FIG. 1 is a perspective view of a prior art mop bucket.

Under all circumstances, the water that remains within the container 12 will continue to be clean and hot. This will continue throughout the various cycles of wringing the mop within the container 12. If a wringer 4 (such as shown in FIG. 1) is used to squeeze the mop strings, then the debris will be deposited adjacent to the top level of water within the container 12 so that it more quickly will flow out of the fluid outlet 20. After the mop is been squeezed in the wringer 4, the debris is released therefrom and quickly discharged through the fluid outlet. The mop is then reinserted in the clean water within the interior of the container 12.

So as to maintain a clean floor, it is important to avoid the situations where the amount of water delivered through the fluid inlet 18 exceeds the capacity of the fluid outlet 20 to discharge the water. As such, the fluid outlet 20 has a diameter greater than the diameter of the fluid inlet 18. Furthermore, a water reducer can be inserted into the fluid inlet 18 so as to restrict the rate of water flow into the interior of the container 12. As such, no matter how wide open the faucet is, the rate of water flow into the interior of the container 12 will be limited by the present invention.

Figure 3:
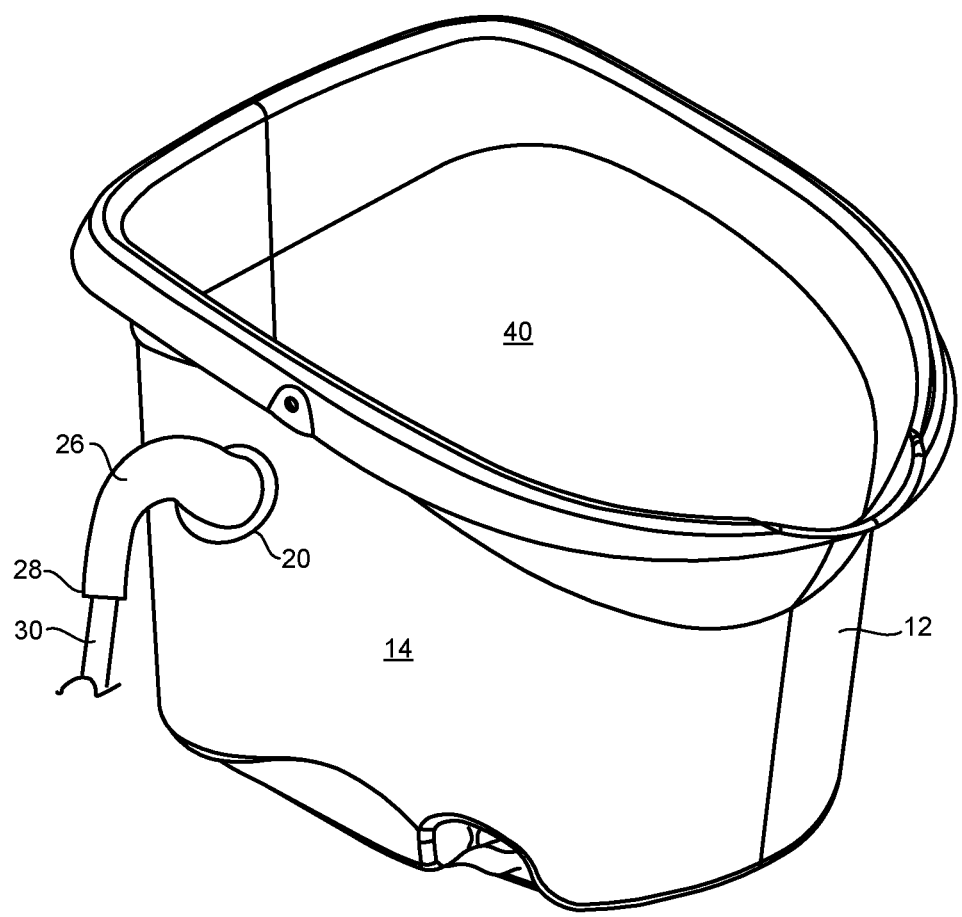
FIG. 3 is an upper perspective view showing the washing bucket in accordance with the teachings of the present invention.

FIG. 3 shows the container 12 having an interior 40. The fluid outlet 20 opens through the wall 14 of the container 12. The fluid outlet 20 includes the pipe 26. In FIG. 3, the pipe 26 is an elbow swivel. The conduit 30 is attached by various means to the end 28 of pipe 26.

Figure 4:
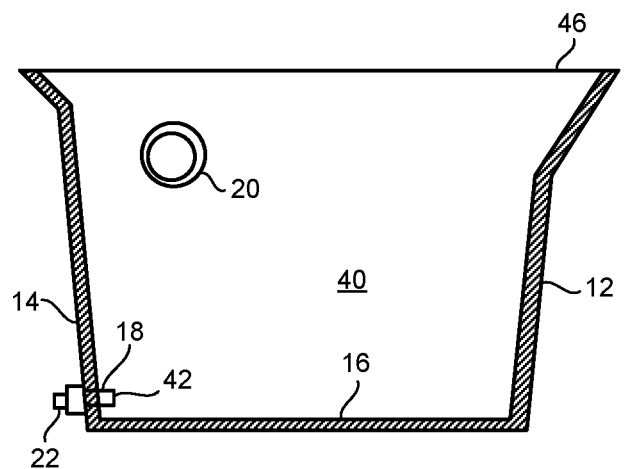
FIG. 4 is a cross-sectional view showing the washing bucket in accordance with the present invention.

FIG. 4 is a cross-sectional view showing the container 12. In particular, it can be seen that the fluid outlet 20 is located at a level higher than that of the fluid inlet 18. The fluid inlet 18 has an end 42 that extends into the interior 40 of the container 12. It can be seen that the end 42 is located slightly above the bottom 16 of the container 12. The fluid inlet 18 has a portion extending exteriorly of the wall 14 of the container 12. Ultimately, the connector 22 is located exterior of the wall 14.

In FIG. 4, it can be seen that the nozzle at the end 42 of the fluid inlet 18 directs a pressurized flow of water adjacent to the bottom 16. Ultimately, the fluid inlet 18 will continue to fill the interior 40 of the container 12 with water until the level of water within the container 12 reaches the level of the outlet 20. The water will then be discharged through the outlet 20. The outlet 20 is located a distance below the upper edge 46 of the container 12. In order to conserve water, the outlet 20 is located a distance from the upper edge 26. As such, an optimal amount of water will continuously reside within the interior 40 of the container 12. The location of the outlet 20 serves to prevent any possibility of water sloshing over the upper edge 46 during the movement of the container 12 or during the mopping operations that are carried out within the container 12.

Figure 5:
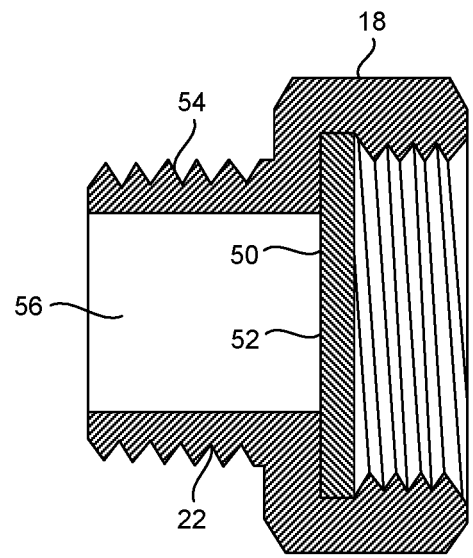
FIG. 5 is a cross-sectional view showing the reducer as placed within the interior of the fluid inlet.

FIG. 5 shows the water reducer 50 is used within the fluid inlet 18. The water reducer 50 is a generally flat disk of an elastomeric material. There is a hole 52 formed through the disk 50. Ultimately, when the water hose is connected to the threads 54 of the connector 22 of the fluid inlet 18, the pressure rise water flow from the water hose will flow through interior passageway 56 toward the water reducer 50. The only water that will flow past the water reducer 50 will be that water which passes through the hole 52. As such, the water reducer 50 serves to reduce the rate of water flow into the interior of the container 12. The water reducer assures that no matter how much pressure is directed by the water hose toward the container 12, only a limited amount of water will be released into the interior of the container. As such, there is no possibility of overflowing the upper edge of the container 12.

Figure 6:
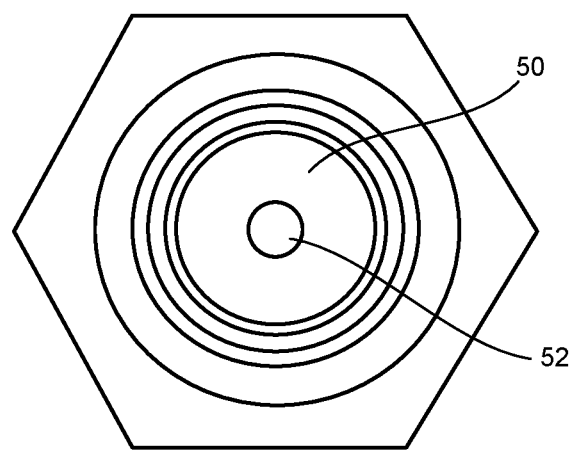
FIG. 6 is an end view showing the reducer within the fluid inlet.

FIG. 6 further shows the water reducer 50 and the hole 52 formed therein.

Figure 7:
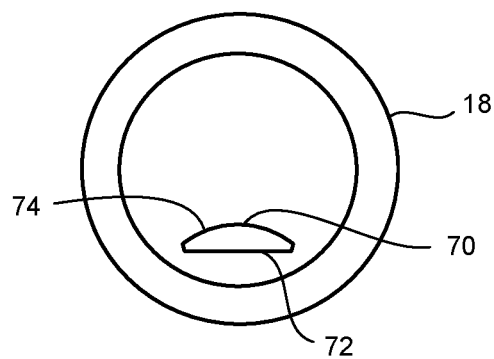
FIG. 7 is an end view showing the nozzle located within the interior of the container of the present invention.

FIG. 7 is an end view showing the fluid inlet 18 and the nozzle 70 at the end of the fluid inlet 18 in the interior 40 of the container 12. The nozzle 70 is adapted to direct a pressurized flow of water toward an area adjacent to the bottom of the container. It can be seen that the nozzle 70 has the shape of a chord of a circle. The straight edge 72 of the chord of the circle is below the curved portion 74. Experiments with this configuration of nozzle have shown that it creates a strong laminar flow of water in a straight direction adjacent to the bottom 16 of the container 12. The curved portion 74 of the nozzle 70 creates a strong flow that tends to spread slightly upwardly from the bottom of the container. As such, these flows of water tend interact with the strings of a mop so as to forcibly remove debris over the strings.

Figure 8:
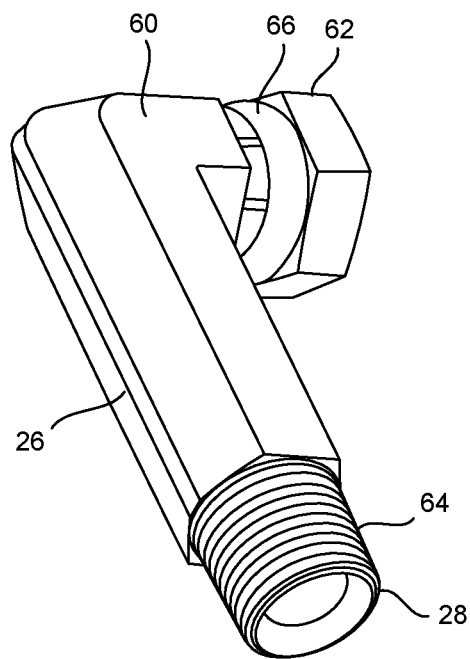
FIG. 8 is a perspective view showing an elbow swivel as affixed to the fluid outlet of the washing bucket of the present invention.

FIG. 8 shows one configuration of a pipe 26 that can be used with the fluid outlet 20 of the present invention. FIG. 8 shows a swivel pipe 60 having one end 62 affixed to the fluid outlet 20 and an opposite end 28 that has threads 64 suitable for securing to a conduit. The elbow swivel 60, as shown in FIG. 8, can be movable about pivot joint 66 between a first position extending upwardly and a second position extending downwardly. When the elbow swivel 60 is in the downward position, it is suitable for delivering water flowing from the interior of the container 12 toward the conduit 30. On the other hand, when the elbow swivel 60 is in the upper position (in which the end 28 is located above the swivel joint 66) it will allow the washing bucket 10 to be used as a conventional bucket. In other words, when a cap is placed over the fluid inlet 18 so as to close the fluid inlet, a continuous supply of water is not being delivered into the interior of the container 12. Since the elbow swivel 60 has its end above the level of water within the bucket, no water will pass outwardly of the end 28. As such, this easily allows one to convert the continuous-flow washing bucket 10 of the present invention into a conventional mop bucket.

Figure 9:
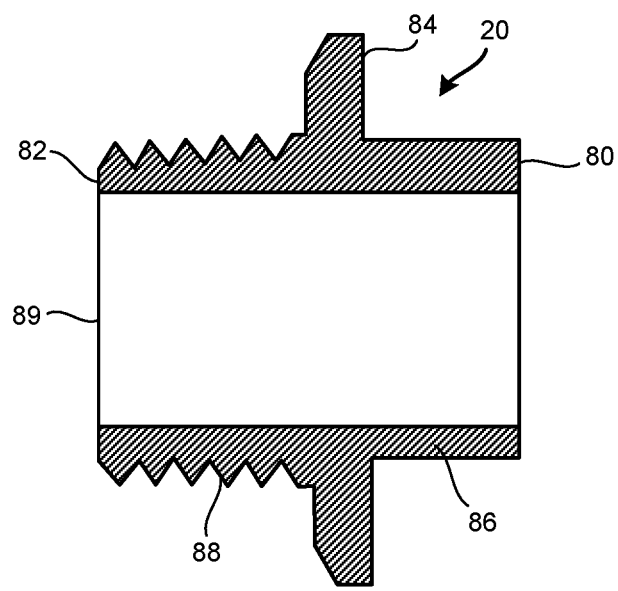
FIG. 9 is a cross-sectional view showing the fluid outlet of the present invention.

FIG. 9 shows an alternative embodiment of the fluid outlet 20. As can be seen, the fluid outlet 20 has one end 80 that will be located in the interior 40 of the container 12 and an opposite end 82 that is located exteriorly of the container 12. A flange or shoulder 84 extends radially outwardly of the body 86 of the fluid outlet 20. Flange or shoulder 84 can be embedded within the polymeric material of the container 12 or can be used as a shoulder to be bonded to one of the interior and exterior walls of the container 12. A threaded portion 88 will extend exteriorly of the wall of the container. A corresponding female threaded portion of a conduit can be joined to threaded portion 88 so as to extend outwardly therefrom. Alternatively, the elbow swivel 60 (such as shown in FIG. 8) can be joined to this threaded portion 88.

Figure 10:
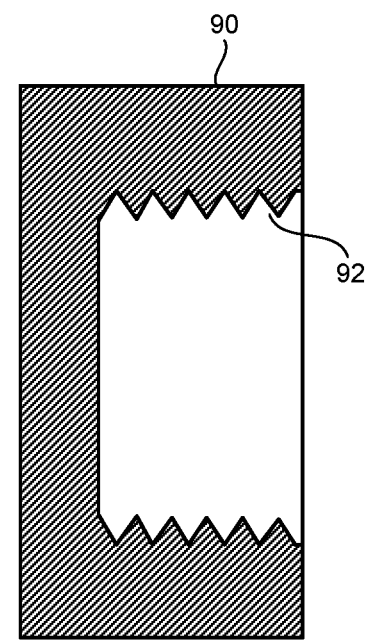
FIG. 10 is a cross-sectional view of a cap that can be used on the threaded portion of the fluid outlet of the present invention.

FIG. 10 shows a cap 90 that is adapted to be affixed over the threaded portion 88 of the fluid outlet 20. Cap 90 has female threads 92 formed in an interior thereof. Cap 90 can be simply screwed onto the threaded portion 88 so as to close the outlet end 89 of the fluid outlet 20.

Figure 11:
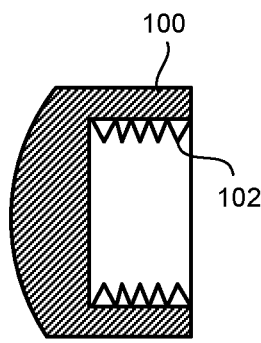
FIG. 11 is a cross-sectional view of a cap that can be used with the connector of the fluid inlet of the washing bucket of the present invention.

FIG. 11 shows a cap 100 that can be used for attachment to the fluid inlet 18. Once again, the cap 100 includes female threads 102 that can be joined to the male threads of the connector 22 of the fluid inlet 18. Cap 100 can then be tightened onto the fluid inlet 18 so as to close the fluid inlet. When the cap 100 is placed over the fluid inlet 18 and the when the cap 90 is placed over the fluid outlet 20, the washing bucket of the present invention can be used as a conventional wash bucket. Such a configuration can be used in those situations where water supplies or drains are not conveniently available.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A washing bucket comprising:
   a container having an interior defined by a wall and a bottom, said container having an upper edge opposite said bottom;
   a fluid inlet affixed to said wall of said container, said fluid inlet communicating with the interior of said container, said fluid inlet positioned adjacent to the bottom of said container; and
   a fluid outlet opening through said wall of said container, said fluid outlet positioned at a level higher than a level of said fluid inlet, the level of said fluid outlet positioned below a lowest level of the upper edge of said container.

2. The washing bucket of claim 1, said fluid outlet having a diameter greater than a diameter of said fluid inlet.

3. The washing bucket of claim 2, said fluid outlet comprising a pipe affixed to said wall of said container, one end of said pipe opening to the interior of said container, an opposite end of said pipe positioned exterior of said container.

4. The washing bucket of claim 3, said pipe having an elbow swivel mounted to said container so as to be movable between a first position in which said opposite end of said pipe extends upwardly and a second position in which said opposite end of said pipe extends downwardly.

5. The washing bucket of claim 3, further comprising:
   a conduit affixed to said opposite end of said pipe, said conduit extending away from said container.

6. The washing bucket of claim 5, said conduit being removably affixed to said opposite end of said pipe.

7. The washing bucket of claim 3, further comprising:
   a cap removably affixed to said opposite end of said pipe so as to close the opposite end of said pipe.

8. A mop bucket comprising:
   a container having an interior defined by a wall and a bottom, said container having an upper edge opposite said bottom;
   a fluid inlet affixed to said wall of said container, said fluid inlet communicating with the interior of said container, said fluid inlet positioned adjacent to the bottom of said container, said fluid inlet having a connector positioned exterior of said wall of said container, said connector adapted to connect to a water hose; and
   a fluid outlet opening through said wall of said container, said fluid outlet positioned at a level higher than a level of said fluid inlet, the level of said fluid outlet positioned below a lowest level of the upper edge of said container.

9. The mop bucket of claim 8, said fluid outlet having a diameter greater than a diameter of said fluid inlet.

10. The mop bucket of claim 8, said fluid outlet comprising a pipe affixed to said wall of said container, one end of said pipe opening to the interior of said container, an opposite end of said pipe positioned exterior of said container.

11. The mop bucket of claim 10, said pipe being an elbow swivel mounted to said container so as to be movable between a first position in which said opposite end of said pipe extends upwardly and a second position in which said opposite end of said pipe extends downwardly.

12. The mop bucket of claim 8, further comprising:
    a water hose threadedly connected to said connector of said fluid inlet, said water hose extending exteriorly of said container, said water hose adapted to deliver a supply of water to said fluid inlet; and
    a conduit affixed to said opposite end of said pipe, said conduit extending away from said container, said conduit adapted to pass water from an upper level of water within said container.

* * * * *